United States Patent [19]

Kimball

[11] Patent Number: 4,807,861
[45] Date of Patent: Feb. 28, 1989

[54] SWIVEL VISE

[76] Inventor: Keesey H. Kimball, P.O. Box 217, Alpine, Tex. 79831

[21] Appl. No.: 142,009

[22] Filed: Jan. 11, 1988

[51] Int. Cl.⁴ .............................................. B23Q 3/04
[52] U.S. Cl. ...................................................... 269/75
[58] Field of Search .............................. 269/71, 73, 75

[56] References Cited

FOREIGN PATENT DOCUMENTS 2912832 10/1980 Fed. Rep. of Germany ........ 269/75

OTHER PUBLICATIONS

Colbert Die Cast Company "Panavise".

Primary Examiner—Gene Wan
Attorney, Agent, or Firm—John M. Harrison

[57] ABSTRACT

A swivel vise which is used primarily for finishing gun stocks and is characterized by a conventional vise assembly mounted on one end of a ball mount shaft for engaging a gun stock and a ball joint assembly also engaging the ball mount shaft intermediate the ends thereof and spaced from the vise assembly, to facilitate manipulation of the ball mount shaft and the vise assembly into a selected position. In a preferred embodiment of the invention, positioning of the vise assembly in a selected attitude is facilitated by operation of a ring tensioning device which receives the ball joint assembly and is mounted on a mount block that can be attached to a work bench. The ball joint assembly includes a split ball carried by a split ring, the ends of which split ring are attached to fixed and movable elements, respectively, of the ring tensioning device, in order to manipulate the vise assembly into the selected position with respect to the mount block for finishing the gun stock.

16 Claims, 1 Drawing Sheet

U.S. Patent  Feb. 28, 1989  4,807,861
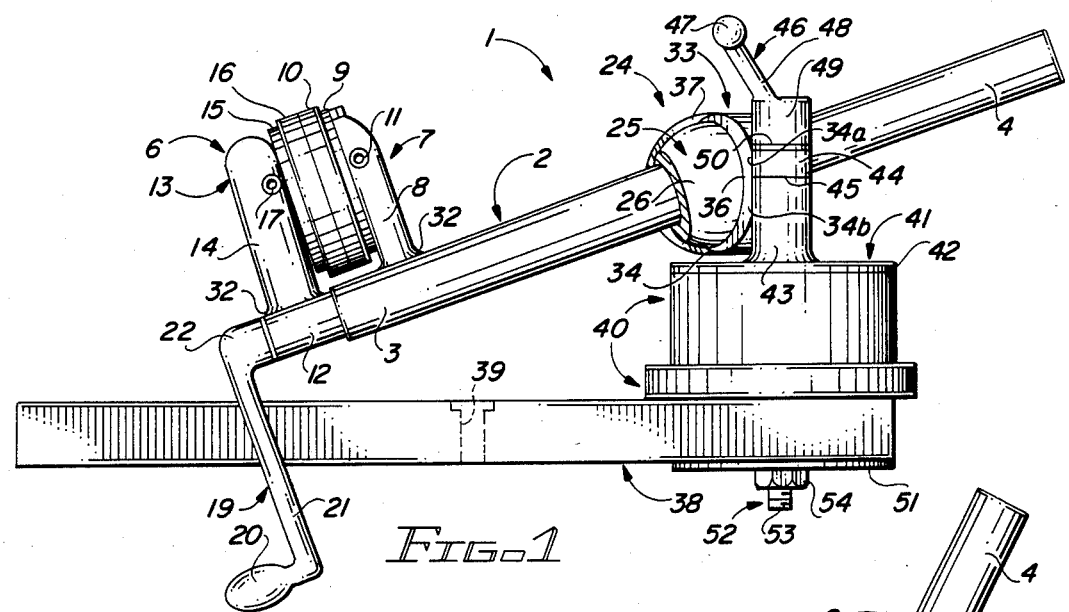
FIG.-1
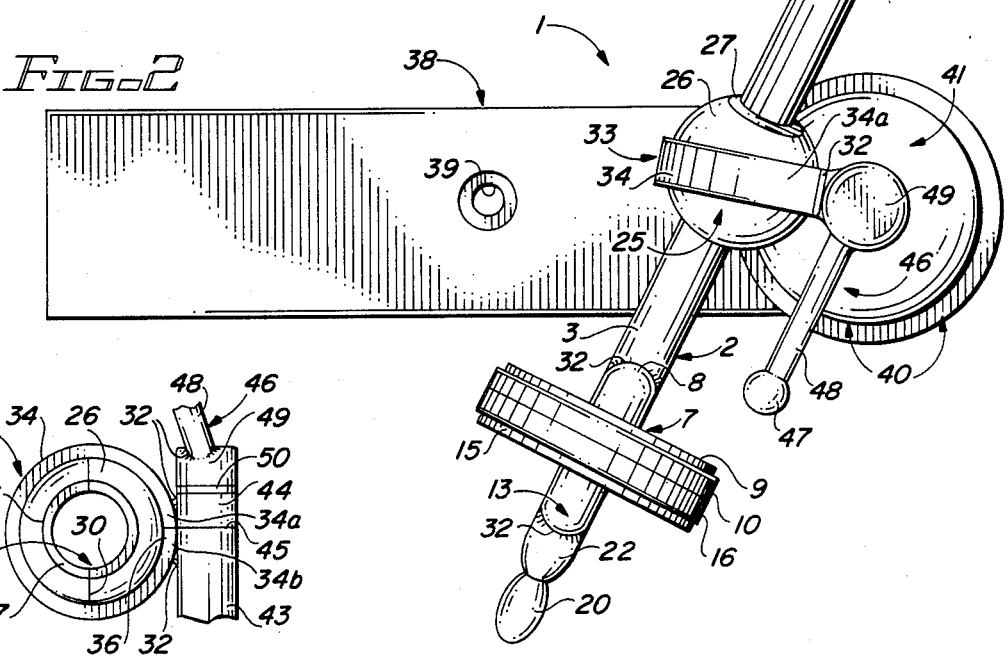
FIG.-2
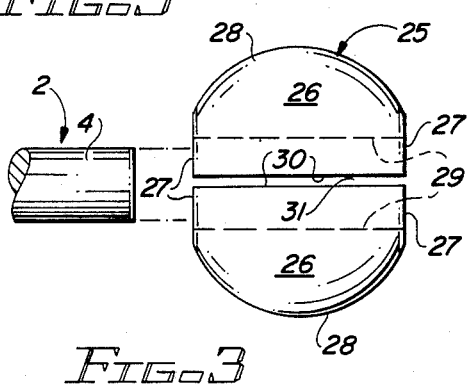
FIG.-3
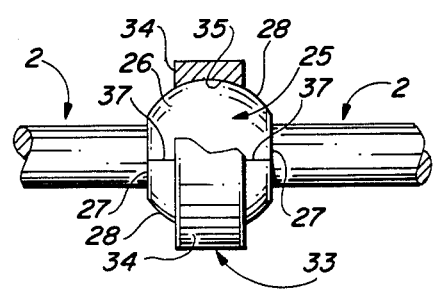
FIG.-4
FIG.-5

SWIVEL VISE

BACKGROUND OF THE INVENTION

1. Field of the Invention

This invention relates to a vise apparatus and more particularly, to a swivel vise which is characterized by a vise assembly having fixed and movable jaw members attached to one end of a ball mount shaft and a ball joint assembly connecting the ball mount shaft to a ring tensioner secured to a mount block, in order to facilitate positioning the vise assembly into a selected position with respect to the mount block, for finishing a gun stock mounted between the fixed and movable vise jaws. In a most preferred embodiment of the invention, the ball joint assembly is characterized by a split ball rotatably joined to the ball mount shaft by means of a cooperating split ring, one end of which split ring is secured to the fixed element of the ring tensioner and the opposite end fastened to the movable element of the ring tensioner. Accordingly, compression of the split ring against the split ball by manipulation of the ring tensioner locates the vise assembly and the gun stock in any desired position with respect to the mount block or workbench to which the mount block is secured, in order to present all surfaces of the gun stock to the craftsman at a selected angle.

One of the problems realized in the finishing of various asymmetrical objects such as wooden gun stocks and the like, is that of positioning the object in a vise at an attitude and location which easily facilitates shaping, smoothing and finishing all surfaces of the object. For example, in the case of wooden gun stocks, a conventional vise is capable of securing the gun stock in an immobile position in either a vertical or a horizontal plane without further adjustment. This limitation in orientation of the gun stock in the vise jaws makes it difficult to accurately shape, smooth and finish the gun stock, since all surfaces of the gun stock cannot be viewed at the proper angle by the craftsman. Furthermore, mounting of the gun stock in a conventional vise does not facilitate access to all areas of the gun stock in any given stage of the operation, for proper finishing.

2. Description of the Prior Art

The search revealed a number of prior art patents concerned with vise apparatus used for various purposes. These patents are listed below and a copy of each is enclosed. U.S. Pat. No. 1,192,267, dated July 25, 1916, to U. G. Bond, details an "Armed Vise". The armed vise is characterized by a base, a staff upstanding from the base, a ball and socket mechanism operatively uniting the staff with the base and means for holding the constituent parts of the ball and socket mechanism against relative movement. An arm is pivoted to the staff, along with means for preventing relative swinging movement between the staff and the arm, an extension and a work-holding grip located at the outer end of the extension, with a second ball and socket mechanism connecting the inner end of the extension to the outer end of the arm. The device further includes means for preventing relative movement between the constituent parts of the second ball and socket mechanism. U.S. Pat. No. 1,379,382, dated May 24, 1921, to F. E. Bergstedt, details a "Vise". The vise detailed in this patent includes a stationary jaw, a sliding bar having slotted plunger seats therein, a trip-rod extending longitudinally of the bar and through the seats, means for operating the rod to be raised and lowered through the seats, an adjusting screw provided in one end of the bar and a jaw carried by the adjusting screw and adapted to be adjusted relative to the stationary jaw. A "Work Holding Clamp" is disclosed in U.S. Pat. No. 1,446,811, dated Feb. 27, 1923, to J. H. Rowland. The work holding clamp detailed in this patent includes a supporting rod having a ball head at one end, a supporting standard with a ball socket at one end thereof and a ball at the remaining end, means for clamping the socket upon the ball head of the rod and a pair of gripping jaws fitted for universal adjustment on the ball of the standard. A bracket is fitted on the supporting rod and is provided with a socket, along with a second pair of gripping jaws and an intermediate member by which the second jaw is held for universal adjustment on the bracket socket. U.S. Pat. No. 2,488,296, dated Nov. 15, 1949, to H. E. Kraus, discloses a "Work Support". The work support is designed for supporting work of various shape and size for rotation in a balanced condition about an axis. The device includes a rotatable shaft, means for supporting the shaft with its axis in various angular relationship with respect to the horizontal, an arm, a work-supported supporting table rotatably mounted on one end of the arm to rotate on an axis substantially perpendicular to the arm and a universal joint connection between the other end of the arm and one end of the shaft, for positioning the arm at various angular relationship with respect to the shaft. Further included is means for securing the arm in the desired angular relationship to the shaft to support the work, such that the center of gravity of the arm and the work carried thereby will lie substantially in the axis of rotation of the shaft. U.S. Pat. No. 4,140,307, dated Feb. 20, 1979, entitled "Vises" and issued to Jordi Dalmau, et al. The vise detailed in this patent also includes a pair of conventional vise jaws or a jig for holding the workpiece. The jaws or jig are mounted for rotational movement about a first axis when released from a locked position and also for tilting movement through 90 degrees to the first axis. This movement is achieved by mounting the jaws or jig on the ball element of a ball and socket arrangement, wherein the socket is slotted to enable the tilting movement. The socket arrangement is mounted for rotation, when released from a locked position, in a plane normal to the plane of rotation of the jaws or a jig. Accordingly, by a combination of rotational movement of the jaws or jig and the socket arrangement, as well as tilting movement of the jaws or jig, the workpiece may be disposed in a selected angular orientation and locked in that position. Locking is achieved by conventional clamping means. U.S. Pat. No. 4,171,800, dated Oct. 23, 1979, to Earl R. Weaver, details a "Bench Mounted Support for Jewelry Articles and the Like". The device of this patent includes a work holder assembly which is characterized by a clamp assembly for clamp-retention of the jewelry article, a bench mount assembly and a gimbal-type connector coupling the clamp to the bench mount. The gimbal-connector includes a ring assembly rotatably and hingedly connected to the bench mount and rotatably connected to the clamp. A filing block, interchangeable with the clamp assembly, is adapted for connection with the bench mount.

It is an object of this invention to provide a swivel vise having a vise assembly and a cooperating ball joint assembly for mounting an object in the vise assembly and locating the vise assembly and the object in substantially any selected angular position by operation of the ball joint assembly.

Another object of the invention is to provide a ball joint assembly for supporting a clamp member such as a swivel vise, which is capable of supporting a workpiece, which ball joint assembly enables adjustment of the clamp member to any desired angular position.

Yet another object of the invention is to provide a new and improved swivel vise for mounting on a workbench or other work area, which swivel vise is characterized by a vise assembly mounted on one end of a shaft and a ball joint assembly also attached to the shaft, which ball joint assembly is operable to selectively orient the vise assembly in substantially any desired angular orientation with respect to the workbench for finishing a work stock clamped in the vise assembly.

A still further object of the invention is to provide a swivel vise which includes a vise assembly for securing a work stock, which vise assembly is mounted on one end of a shaft. The shaft is clamped between a pair of hemispherically-shaped ball segments joined by a split ring carried by a ring tensioner, such that the vise assembly and work stock can be positioned in substantially any desired angular orientation with respect to a craftsman by manipulation of the shaft and ball segments in the split ring, responsive to operation of the ring tensioner.

SUMMARY OF THE INVENTION

These and other objects of the invention are provided in a new and improved swivel vise which includes a shaft having a clamp member such as a vise assembly located on one end, which vise assembly is capable of mounting a work stock between the jaws thereof, and a ball joint assembly spaced from the vise assembly and characterized by a pair of hemispherically-shaped ball segments carried by a ring for clamping the ball segments to the shaft in spaced relationship with respect to the vice assembly. The swivel vise further includes a ring tensioner attached to the split ring for selectively clamping the ball segments on the shaft and locating the vise assembly in a selected angular orientation with respect to a craftsman.

BRIEF DESCRIPTION OF THE DRAWING

The invention will be better understood by reference to the accompanying drawing, wherein:

FIG. 1 is a perspective view of a preferred embodiment of the swivel vise of this invention;

FIG. 2 is a top elevation of the swivel vise illustrated in FIG. 1;

FIG. 3 is an exploded view of the split ball component of a ball joint assembly utilized in the swivel vise illustrated in FIGS. 1 and 2;

FIG. 4 is a front elevation, partially in section, of the split ball and split ring elements of the ball joint assembly illustrated in FIGS. 1 and 2; and FIG. 5 is an end view of the ball joint assembly illustrated in FIG. 4.

DESCRIPTION OF THE PREFERRED EMBODIMENTS

Referring initially to FIGS. 1 and 2 of the drawing, the swivel vise of this invention is generally illustrated by reference numeral 1. The swivel vise 1 is characterized by a round ball mount shaft 2, having a vise end 3 and a free end 4. A vise assembly 6 is mounted on the vise end 3 of the ball mount shaft 2 and is further characterized by a fixed jaw 7, which is attached to the vise end 3 by means of a weld 32 and is provided with a fixed jaw bracket 8, to which a fixed jaw plate 9 is attached. The fixed jaw plate 9 further receives a fixed jaw plate pad 10 for engaging a work stock such as the stock of a shotgun or a rifle (not illustrated). In a most preferred embodiment of the invention, the fixed jaw plate 9 and thus, the fixed jaw plate pad 10, are removably secured to the fixed jaw bracket 8 by means of an insert (not illustrated) which recesses in a cooperating slot (not illustrated) provided in the fixed jaw bracket 8. A fixed jaw allen screw 11 is threadibly seated in the fixed jaw bracket 8 and engages the insert carried by the fixed jaw plate 9, to removably seat the fixed jaw plate 9 and the fixed jaw plate pad 10 in the fixed jaw bracket 8, as illustrated in FIGS. 1 and 2. A telescoping shaft 12 is inserted in the vise end 3 of the ball mount shaft 2 and supports a movable jaw 13, as illustrated. In a preferred embodiment of the invention, the movable jaw bracket 14 component of the movable jaw 13 is attached to the telescoping shaft 12 by means of a weld 32 and receives a movable jaw plate 15, which in turn, carries a movable jaw plate pad 16 that mates with the fixed jaw plate pad 10 when the telescoping shaft 12 is fully telescoped inside the vise end 3 of the ball mount shaft 2, as illustrated in FIGS. 1 and 2. As in the case of the fixed jaw bracket 8, the movable jaw bracket 14 is fitted with a movable jaw allen screw 17, which engages a corresponding insert (not illustrated) that is provided in registration with a cooperating slot (not illustrated) located in the face of the movable jaw bracket 14, in order to mount the movable jaw plate 14 and the movable jaw plate pad 16 to the movable jaw bracket 14. Accordingly, it will be appreciated that both the fixed jaw plate pad 10 and the movable jaw plate pad 16 can be periodically removed, when damaged, by loosening the fixed jaw allen screw 11 and the movable jaw allen screw 17 and removing the fixed jaw plate 9 and the movable jaw plate 15, respectively. The fixed jaw plate pad 10 and the movable jaw plate pad 16 can then be removed from the fixed jaw plate 9 and the movable jaw plate 15, respectively, and periodically replaced, as desired. Alternatively, it will be appreciated by those skilled in the art that the fixed jaw allen screw 11 and movable jaw allen screw 17 may be replaced by roll pins (not illustrated), which extend through the fixed jaw bracket 8 and the movable jaw bracket 14, as well as the respective inserts, to pivotally mount the fixed jaw plate 9 and the movable jaw plate 15 in the fixed jaw bracket 8 and the movable jaw bracket 14, respectively. This mounting of the fixed jaw plate 9 and the movable jaw plate 15 facilitates a more consistent grip by the fixed jaw plate pad 10 and the movable jaw plate pad 16 on a work stock. The handle base 22 of a handle 19 is provided with a threaded rod (not illustrated) which extends through the telescoping shaft 12 into threadible engagement with the interior of the vise end 3 of the ball mount shaft 2. Accordingly, grasping of the handle grip 20, which is attached to one end of the handle shaft 21, and rotation of the handle 19 in the counterclockwise direction as viewed from the front, will cause the telescoping shaft 12 and thus, the movable jaw 13, to retract from the fixed jaw 7, to facilitate insertion of a work stock between the fixed jaw plate pad 10 and removable jaw plate pad 16, respectively. Conversely, rotation of the handle 19 in the clockwise direction as viewed from the front, causes the movable jaw 13 to approach the fixed jaw 7 and tighten the fixed jaw plate pad 10 and the movable jaw plate pad 16 on a work stock located therebetween.

A ball joint assembly 24 is used to attach the mid-section of the ball mount shaft 2 to a ring tensioner 46, as further illustrated in FIGS. 1 and 2. Referring now to FIGS. 1-5 of the drawing and specifically to FIGS. 1, and 5, a pair of ball hemispheres 26 of a split ball 25 are mounted on the ball mount shaft 2 by operation of a split ring 33. As illustrated in FIG. 3, each of the ball hemispheres 26 is characterized by spaced, truncated end portions 27, a ball radius 28 connecting the end portions 27 and a curved shaft seat 29 positioned in oppositely-disposed relationship, respectively, for seating on the ball mount shaft 2. The split edges 30 of the respective ball hemispheres 26 are dislocated to define a ball slot 31 for insertion of the free end 4 of the ball mount shaft 2 through the respective shaft seats 29, as illustrated in FIG. 3. As further illustrated in FIGS. 4 and 5 of the drawing, the split ring 33 is further characterized by a ring body 34, provided with a body split 36 at one point on the circumference thereof and an internal body radius 35, which matches the curvature of the ball radius 28, for maintaining the split ring 33 on the ball hemispheres 26 of the split ball 25. As illustrated in FIGS. 1 and 5, the movable body segment 34a of the ring body 34 is fixedly secured to the pedestal ring 44 of the ring tensioner 46. Furthermore, the fixed body segment 34b of the ring body 34 is welded or otherwise fixedly attached to the pedestal 43 of the ring tensioner 46. The pedestal 43 of the ring tensioner 46 is secured to the collar seat plate 42 of a collar seat 41, which collar seat 41 is in turn, fixedly mounted to a collar seat base 40, mounted on a mount block 38. The fixed pedestal 43 receives the "floating" pedestal ring 44 at a pedestal match line 45, as illustrated in FIG. 1. A bushing 50 is provided on the top surface of the pedestal ring 44 and receives a tensioner collar 49, fitted with a projecting tensioner handle 48 and a tensioner grip 47, as further illustrated in FIG. 1. In a first preferred embodiment, the tensioner collar 49 is further provided with a threaded member (not illustrated) which extends through the bushing 50 and the pedestal ring 44 and threadibly seats in the pedestal 43. In a second preferred embodiment of the invention, the tensioner collar 49 includes a tensioner shank 52, which projects through aligned openings (not illustrated) in the pedestal 43, collar seat plate 42, collar seat base 40 and mount block 38, respectively. A mount block washer 51 is fitted adjacent the bottom surface of the mount block 38 and a shank nut 54 is threaded on the shank threads 53 of the tensioner shank 52. Accordingly, in both embodiments, rotation of the tensioner handle 48 in the counterclockwise direction as viewed from the top, loosens the tensioner collar 49 and the pedestal ring 44, to facilitate opening of the body split 36 as the pedestal match line 45 is opened. This maneuver also facilitates movement of the ball mount shaft 2 and the split ball 25 into substantially any angular orientation with respect to the ring tensioner 46, and the mount block 38. The maneuver further facilitates both linear and rotational movement of the ball mount shaft 2 inside the split ball 25 to locate the vise assembly 6 at a selected distance from the ball joint assembly 24 in a 360 degree circle about the axis of the ball mount shaft 2. Conversely, tightening of the ring tensioner 46 by manipulation of the tensioner grip 47 and the tensioner handle 48 in the clockwise direction as the ring tensioner is viewed from the top, tightens the tensioner collar 49 on the bushing 50 and the pedestal ring 44 and closes the pedestal match line 45 and the split edge match line 37 between the ball hemispheres 26, to maintain the ball mount shaft 2 in a selected linear and rotated position inside the split ball 25 and the split ball 25 in a selected rotated position inside the split ring 33. Consequently, the vise assembly 6 can be located in any angular position with respect to the mount block 38 and to the craftsman, by initially loosening the ring tensioner 46, manipulating the vise assembly 6 and the ball mount shaft 2 into a desired configuration and subsequently tightening the ring tensioner 46.

Referring again to FIGS. 1 and 2 of the drawing, it will be appreciated that the mount block 38 may be secured to a conventional workbench or other work area by C-clamps or otherwise, as desired. However, in a most preferred embodiment of the invention, a mount block opening 39 is provided in the mount block 38 for bolting the mount block 38 to a workbench or other work facility, in order to immobilize the mount block 38 and facilitate manipulation of the vise assembly 6 into a desired configuration for finishing a work stock clamped between the fixed jaw 7 and the movable jaw 13 of the vise assembly 6, as heretofore described.

It is understood by those skilled in the art that the ball joint assembly 24 element of the swivel vise 1 of this invention facilitates manipulation of a clamp member and work stock into substantially any angular orientation and position with respect to a craftsman by adjustment of the ring tensioner 46 and orienting the vice assembly 6 in that selected position. Alternatively, the ball joint assembly 24 can also be used to selectively orient a working means in other mechanisms such as jigs, robotic devices and the like, in non-exclusive particular, according to the knowledge of those skilled in the art. Furthermore, the swivel vise 1 is portable, in that the mount block 38 can be removed from attachment to a workbench or other fixed surface and carried to another location for reattachment using C-clamps or an appropriate bolt for fitting through the mount block opening 39, as heretofore described. Alternatively, it will be appreciated that the swivel vise 1 can be permanently mounted by means of the collar seat base 40 directly to a workbench or other work facility without using the mount block 38, as desired.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A swivel member comprising an elongated shaft; working means carried by one end of said shaft for engaging a workpiece; a split ball mounted on said shaft in spaced relationship with respect to said working means wherein said shaft extends through and beyond said split ball; and a narrow split ring having a fixed body segment and a movable body segment lying adjacent to said fixed body segment, said split ring having an internal curved radius for substantially matching the curvature of said split ball and adapted to substantially encircle said split ball and retain said split ball in universally rotating relationship; a pedestal having an extending end fixedly receiving said fixed body segment of said split ring; and a tensioner collar threadibly carried by said pedestal, with said movable body segment of said split ring fixedly attached to said tensioner collar, whereby tightening of said tensioner collar on said pedestal tightens said split ring on said split ball and loosening of said tensioning collar on said pedestal loosens said split ring on said split ball and said split ball is substantially universally rotatable in said split ring and said working means is substantially universally adjustable responsive to manipulation of said split ball in said split ring.

2. The swivel member of claim 1 wherein said working means further comprises a vise having a fixed jaw fixedly secured to said one end of said shaft and a movable jaw adjustably carried by said one end of said shaft, for removably securing the workpiece between said fixed jaw and said movable jaw.

3. The swivel member of claim 1 wherein said shaft is round and said split ball further comprises a pair of generally hemispherically-shaped ball segments, each of said ball segments having a rounded shaft seat for fitting on said shaft in oppositely-disposed relationship.

4. The swivel member of claim 3 further comprising base means for supporting said collar means on a stable surface and wherein
said working means further comprises a vise having a fixed jaw fixedly secured to one end of said shaft and a movable jaw adjustably carried by said one end of said shaft, for removably securing the workpiece between said fixed jaw and said movable jaw.

5. The swivel member of claim 4 further comprising a handle carried by said tensioner collar for selectively tightening and loosening said tensioner collar on said pedestal.

6. A swivel vise for orienting a workpiece in a selected position comprising an elongated, round shaft; vise means secured to one end of said shaft for engaging the workpiece; a pair of generally hemispherically-shaped ball segments provided with spaced, curved shaft seats, respectively, said shaft seats adapted to fit said round shaft and orient said ball segments at oppositely-disposed relationship, said shaft extending through and beyond said ball segments; a narrow split ring having a fixed segment and a moveable body segment separated from said fixed body segment, said split ring having an internal curved radius for substantially matching and substantially encircling said ball segments and retaining said ball segments on said shaft in substantially universally adjustable relationship; base means carrying said split ring for mounting said split ring on a stable surface; and a pedestal fixedly attached to said base means, with the extending end of said pedestal fixedly receiving said fixed body segment of said split ring; and further comprising a tensioner collar threadibly carried by said pedestal, with said movable body segment of said split ring fixedly attached to said tensioner collar, whereby tightening of said tensioner collar on said pedestal tightens said split ring on said ball segments and loosening said tensioner collar on said pedestal loosens said split ring on said ball segments and said vise means and the workpiece are adjustable in substantially universal relationship with respect to said base means responsive to manipulation of said tensioner collar.

7. The swivel vise of claim 6 wherein said vise means further comprises a fixed jaw fixedly secured to said one end of said shaft and a movable jaw adjustably carried by said one end of said shaft, for securing the workpiece between said fixed jaw and said movable jaw.

8. The swivel vise of claim 7 further comprising a handle carried by said tensioner collar for selectively tightening and loosening said tensioner collar on said pedestal.

9. The swivel vise of claim 6 further comprising a shank projecting from said tensioner collar, said shank projecting through said pedestal and said base means and retainer means provided on said shank for securing said tensioner collar on said pedestal.

10. The swivel vise of claim 9 further comprising a washer provided between said retainer means and said base means.

11. The swivel vise of claim 9 further comprising a handle carried by said tensioner collar for selectively tightening and loosening said tensioner collar on said pedestal and wherein said shank is threaded, said retainer means is a nut and said vise means further comprises a fixed jaw fixedly secured to said one end of said shaft, for removably securing the workpiece between said fixed jaw and said movable jaw.

12. A swivel vise for universally orienting a workpiece in a selected position, comprising an elongated, round shaft of selected length; vise means secured to one end of said shaft for removably engaging and supporting the workpiece; a pair of generally hemispherically-shaped ball segments provided with spaced, curved shaft seats, respectively, said shaft seats adapted to fit said round shaft and orient said ball segments on said shaft in oppositely-disposed relationship, wherein said shaft extends through and beyond said ball segments; a narrow split ring having a fixed body segment and a movable body segment lying adjacent to said fixed body segment, said split ring having an internal curved radius and adapted to substantially encircle said ball segments and retain said ball segments on said shaft; a pedestal having an extending end fixedly receiving said fixed body segment of said split ring; and a tensioner collar threadibly carried by said pedestal, with said movable body segment of said split ring fixedly attached to said tensioner collar, whereby tightening of said tensioner collar on said pedestal tightens said split ring on said ball segments and loosening said tensioner collar on said pedestal loosens said split ring on said ball segments, and wherein said ball segments are substantially universally rotatable inside said split ring.

13. The swivel vise of claim 12 wherein said vise means further comprises a fixed jaw fixedly secured to said one end of said shaft and a movable jaw adjustably carried by said one end of said shaft, for removably securing the workpiece between said fixed jaw and said movable jaw.

14. The swivel vise of claim 12 further comprising a handle carried by said tensioner collar for selectively tightening and loosening said tensioner collar on said pedestal.

15. The swivel vise of claim 12 further comprising a shank projecting from said tensioner collar, said shank projecting through said pedestal and said base means and retainer means provided on said shank for securing said tensioner collar on said pedestal.

16. The swivel vise of claim 12 further comprising a handle carried by said tensioner collar for selectively tightening and loosening said tensioner collar on said pedestal and wherein said shank is threaded, said retainer means is a nut adapted for threadible attachment to said shank and said vise means further comprises a fixed jaw fixedly secured to said one end of said shaft and a movable jaw adjustably carried by said one end of said shaft, for removably securing the workpiece between said fixed jaw and said movable jaw.

* * * * *